United States Patent
Wäller

(10) Patent No.: US 8,564,560 B2
(45) Date of Patent: Oct. 22, 2013

(54) METHOD FOR OPERATING A CONTROL SYSTEM FOR A VEHICLE AND CONTROL SYSTEM FOR A VEHICLE

(75) Inventor: Christoph Wäller, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 132 days.

(21) Appl. No.: 13/002,952

(22) PCT Filed: Apr. 7, 2009

(86) PCT No.: PCT/EP2009/002563
§ 371 (c)(1),
(2), (4) Date: Mar. 9, 2011

(87) PCT Pub. No.: WO2010/003471
PCT Pub. Date: Jan. 14, 2010

(65) Prior Publication Data
US 2011/0148799 A1 Jun. 23, 2011

(30) Foreign Application Priority Data
Jul. 9, 2008 (DE) .......................... 10 2008 032 377

(51) Int. Cl.
*G06F 3/041* (2006.01)

(52) U.S. Cl.
USPC ......................................... 345/173; 715/800

(58) Field of Classification Search
USPC .................... 345/173–178; 173/18.01–19.01; 715/800
See application file for complete search history.

(56) References Cited

U.S. PATENT DOCUMENTS

| 4,790,028 | A * | 12/1988 | Ramage ......................... 382/298 |
| 6,073,036 | A * | 6/2000 | Heikkinen et al. ......... 455/550.1 |
| 2004/0160419 | A1 | 8/2004 | Padgitt |
| 2004/0178994 | A1 | 9/2004 | Kairls |
| 2004/0212601 | A1 | 10/2004 | Cake |
| 2005/0275632 | A1 | 12/2005 | Pu et al. |

(Continued)

FOREIGN PATENT DOCUMENTS

| DE | 69615236 T2 | 6/2002 |
| DE | 102006037156 A1 | 9/2007 |

(Continued)

OTHER PUBLICATIONS

The PCT International Search Report and Written Opinion issued by the ISA/EP in connection with PCT/EP2009/002563 and completed on Aug. 18, 2009.

(Continued)

*Primary Examiner* — Amare Mengistu
*Assistant Examiner* — Stacy Khoo
(74) *Attorney, Agent, or Firm* — Barnes & Thornburg LLP

(57) ABSTRACT

A method for operating an operator control system (1) comprises presentation of at least one operator control panel (5-9) on a display unit (2), wherein the at least one operator control panel (5-9) is provided for a user to touch in order to operate a operator control function, detection of a touch (10-12) on a touch-sensitive interface (3) by the user, determination of whether the at least one operator control panel (5-9) has been hit during the touch (10-12) by virtue of coordinates of the touch (10-12) being compared with coordinates of the at least one operator control panel (5-9), and enlarged presentation of the at least one operator control panel (5-9) if no operator control panel (5-9) has been hit.

11 Claims, 4 Drawing Sheets

(56) References Cited

U.S. PATENT DOCUMENTS

2007/0083827 A1     4/2007    Scott et al.
2007/0180392 A1     8/2007    Russo
2009/0327977 A1*   12/2009   Bachfischer et al. ......... 715/863

FOREIGN PATENT DOCUMENTS

| | | | |
|---|---|---|---|
| EP | 1840522 A | 10/2007 | |
| WO | WO 2009004525 A | 1/2009 | |
| WO | WO 2009024112 A | 2/2009 | |

OTHER PUBLICATIONS

English translation of the PCT International Search Report and Written Opinion issued by the ISA/EP in connection with PCT/EP2009/002563 and completed on Aug. 18, 2009.

English translation of the International Preliminary Report on Patentability issued in connection with PCT/EP2009/002563.

Parallel European Patent Application No. 0977652, dated May 4, 2013.

\* cited by examiner ial application of international application serial No. PCT/EP2009/02563 filed Apr. 7, 2009, which claims priority to German Patent Application No. 102008032377.2 filed Jul. 9, 2008. The entire disclosures of PCT/EP2009/02563 and DE 102008032377.2 are hereby incorporated by reference.

BACKGROUND

The present invention relates to a method for operating an operator control system for a vehicle and to an operator control system for a vehicle and particularly to an operator control system which comprises a graphical display unit and a touch-sensitive interface.

In vehicles, such as passenger vehicles or heavy goods vehicles, a large number of operator control functions, such as operator control of a navigation system, operator control of an audio and video entertainment system or of a ventilation system in the vehicle, etc., are operated using an operator control system which comprises a graphical display unit and a touch-sensitive interface, what is known as a touchscreen. To this end, the touchscreen frequently presents one or more operator control panels, such as buttons, which can be operated by touching the touch-sensitive interface using a finger. On account of the usually limited size of the touchscreen in the vehicle, such operator control panels are small in size. In many operator control situations, such as during the journey, these operator control panels can therefore be hit by the user or driver of the vehicle only with difficulty, and "mishit" arise. Each mishit then requires another operator control attempt. However, the risk of missing the operator control panel is just as high in this case as in the case of the first attempt. This can result in a negative product perception and, on account of the resultant extended total operator control period, in an increased risk to driving safety, since the driver is distracted to a greater extent and for a longer period from what is happening on the road.

SUMMARY

It is therefore an object of this invention to improve the operator control of such an operator control system having a "touchscreen".

The invention achieves this object by means of a method for operating an operator control system for a vehicle according to claim 1 or according to claim 6 and an operator control system for a vehicle according to claim 6. The dependent claims define preferred and advantageous embodiments of the invention.

The invention provides a method for operating an operator control system for a vehicle. The operator control system comprises a graphical display unit and a touch-sensitive interface. The graphical display unit and the touch-sensitive interface may be in the form of a "touchscreen", for example. In this case, coordinates from information presented on the display unit are associated with coordinates of the touch-sensitive interface. In accordance with the method, at least one operator control panel is presented on the display unit. The operator control panel is provided for the purpose of operating an operator control function by virtue of an appropriate region of the touch-sensitive interface being touched by a user. The method involves a touch on the touch-sensitive interface by the user being detected and comparison of the coordinates of the touch with the coordinates of the at least one user interface determining whether the at least one user interface has been hit during the touch. If no operator control panel has been hit, the at least one operator control interface is presented in enlarged form. To be more precise, this means that if only one operator control panel has been presented, this operator control panel is presented in enlarged form if it has not been hit, and if a plurality of operator control panels have been presented, one or more of the operator control panels are presented in enlarged form if none of the plurality of operator control panels has been hit.

If the operator control panels have been missed during an operator control attempt by the user, one or more of the operator control panels are presented in enlarged form, so that a hit probability is increased for a second attempt. Should there be no hits during a second attempt either, the operator control panels can be presented in further enlarged form in order to further increase a hit probability. Enlarged presentation of the operator control panels from the outset would result in a reduction in the total information which can be presented on account of the limited size of the overall display unit. By contrast, if the operator control system recognizes, on the basis of the first mishit, that the user would currently like to operate the operator control panels, a reduction in the total volume of information which can be presented is acceptable in order to increase the hit probability.

In accordance with one embodiment of the method, an enlargement of the at least one operator control panel in the enlarged presentation can be determined on the basis of a distance between the coordinates of the at least one operator control panel and the coordinates of the touch. Thus, by way of example, a long distance between the coordinates of an operator control panel and the coordinates of the touch can involve a small enlargement being chosen, whereas a short distance between the coordinates of an operator control panel and the coordinates of the touch can involve a large enlargement being chosen. Since it can be assumed that the user has missed the required operator control panel only slightly, an operator control panel close to the touch can be enlarged to a great extent, whereas operator control panels which are further away from the touch coordinates are enlarged to a less great extent, since the user presumably wanted to hit the closer operator control panel. In addition, an operator control panel, for example the operator control panel closest to the touch coordinates, can be enlarged to such a great extent that it comprises the coordinates of the touch. If the user touches the same coordinates during his second attempt as during his first attempt in this case, this results in a hit at the second attempt.

Alternatively or in addition, all operator control panels can be enlarged uniformly, for example if the coordinates of the touch are relatively far away from all operator control panels, in order to achieve an increased hit probability for a second attempt.

The present invention provides a further method for operating an operator control system for a vehicle. The operator control system comprises a graphical display unit and a touch-sensitive interface. The method involves at least one operator control panel, which is provided for a user to touch in order to operate an operator control function, being presented on the display unit and the at least one operator control panel being presented in enlarged form on the basis of a state of the operator control system. The state of the operator control system can be altered by inputs from the user. Thus, by way of example, a current operator control context, such as a state of an application in the operator control system or the overall state of the operator control system, can be taken as the basis for determining which function is most probably intended to be operated and for presenting the operator control panel which is associated with this function in appropriately enlarged form. Thus, in the case of an application in a navigation system, for example, input of a navigation destination can be followed by enlarged presentation of an operator control panel for starting routing, since, after the input of the navigation destination, it is usually probable that the routing now needs to be started. Enlarging the relevant operator control panel has a high level of probability of being able to produce a hit during an attempt to touch the operator control panel.

In the methods described above, one embodiment involves a frequency for the enlarged presentation of the at least one operator control panel being determined. By way of example, this can be determined by the operator control system. On the basis of the frequency, the at least one operator control panel can then be presented in enlarged form. In this way, the operator control system "learns" over the course of time which operator control panels are operated more frequently and can achieve an increased hit probability by virtue of enlarged presentation of these operator control panels.

The invention also provides an operator control system for a vehicle. The operator control system comprises a graphical display unit which is designed to present a piece of information for a user, a touch-sensitive interface and a control unit. The touch-sensitive interface is designed such that it can detect a touch by the user and can provide the control unit with appropriate coordinates for the touch. The coordinates of the touch-sensitive interface are associated with coordinates from information presented on the display unit. The control unit is coupled to the display unit and to the touch-sensitive interface. The control unit is capable of presenting at least one operator control panel, which is provided for the user to touch in order to operate an operator control function, on the display unit. When the touch-sensitive interface is touched by the user, touch coordinates are transmitted from the touch-sensitive interface to the control unit and the control unit determines whether the at least one operator control panel has been hit during the touch by comparing the coordinates of the touch with the coordinates of the at least one operator control panel. If a plurality of operator control panels are presented on the display unit, it is determined for each operator control panel, by comparing the coordinates of the respective operator area with the coordinates of the touch, whether the operator control panel has been hit. If no operator control panel has been hit, the control unit presents at least one control area on the display unit in enlarged form.

Such an operator control system is suitable for implementing the previously described embodiments of the method for operating an operator control system for a vehicle and therefore comprises the advantages described above.

BRIEF DESCRIPTION OF THE FIGURES

The present invention is explained below using preferred embodiments with reference to the drawings.

DETAILED DESCRIPTION

Figure 1:
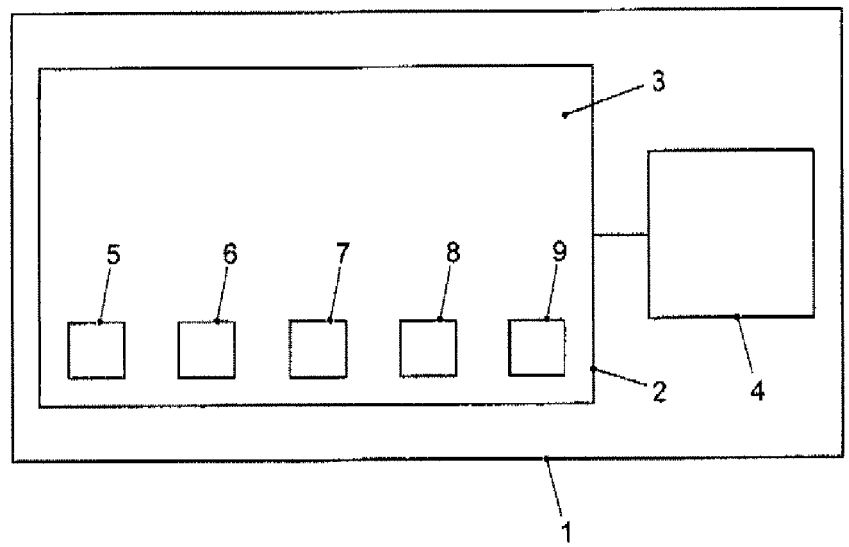
FIG. 1 shows a schematic block diagram of an operator control system in accordance with one embodiment of the present invention.

FIG. 1 shows an operator control system 1 for a vehicle. The operator control system 1 may be an operator control system for a navigation system in the vehicle or for an audio/video system in the vehicle, for example. The operator control system 1 comprises a graphical display unit 2 on which information can be presented for a user. By way of example, the graphical display unit 2 can comprise a screen or a liquid crystal display. In addition, the operator control system 1 comprises a touch-sensitive interface 3, which is fitted on a surface of the graphical display unit 2, and a control unit 4 which are coupled to the display unit 2 and to the touch-sensitive interface 3. The touch-sensitive interface 3 is capable of detecting a touch on the touch-sensitive interface 3 by the user and providing appropriate coordinates as touch coordinates for the control unit 4. Information which can be presented on the graphical display unit 2 by the control unit 4 has coordinates on the display unit 2 which are associated with the coordinates of the touch-sensitive interface 3. Thus, the control unit 4 is rendered able to determine whether the touch-sensitive interface 3 is being touched at a location at which a predetermined piece of information is presented on the display unit 2 by virtue of coordinates of the presented information being compared with coordinates of the touch. By way of example, as FIG. 1 shows, five operator control panels 5-9 can be presented on the display unit 2 for operation of the operator control system 1. The coordinates of the presented operator control panels 5-9 are known to the control unit 4, and when the touch-sensitive interface 3 is touched, the touch-sensitive interface 3 supplies coordinates for the touch to the control unit 4. By comparing the coordinates from the touch-sensitive interface 3, the control unit 4 is able to determine whether or not a touch has occurred in a region of one of the operator control panels 5-9.

If the coordinate comparison establishes that one of the operator control panels 5-9 has been touched, an appropriate piece of information is provided for a further system (not shown) of the operator control system 1, such as a navigation system, by the control unit 4 for further processing.

If, by contrast, the coordinate comparison reveals that none of the operator control panels 5-9 has been touched, a "mishit" has occurred, i.e. the user of the operator control system 1 has presumably attempted to touch one of the operator control panels 5-9 but has not managed to, but rather has touched a region outside of the operating control areas 5-9. A cause of this may be, for example, that the touch by a driver of the vehicle has occurred and the driver of the vehicle has cast only a brief glance at the display unit 2 and has then turned back to what is happening on the road and has subsequently touched the touch-sensitive interface 3 blind, which resulted in the mishit. The mishit may also have been brought about as a result of severe vibration in the vehicle owing to a poor road surface. Since, in the event of a mishit, the operator control system does not show the desired action despite the touch-sensitive interface having been touched, the driver or user of the vehicle will make a second operator control attempt. In order to assist the driver or user in this second attempt, enlarged presentations of the operator control panels 5-9 on the display unit 2 are displayed, as shown subsequently in connection with FIGS. 2-4, on the basis of the nature of the mishit.

Figure 2A:
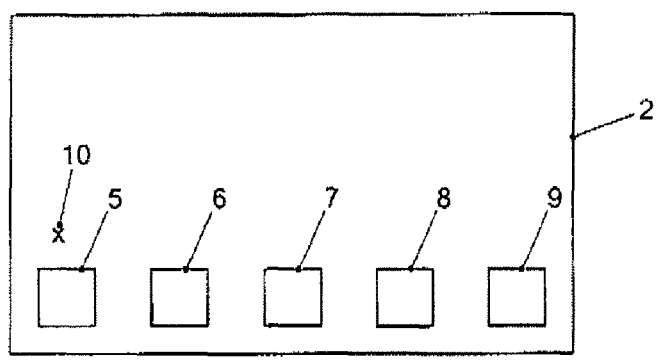
FIGS. 2A-2B schematically show the operation of the operator control system in FIG. 1 in accordance with one embodiment of the invention.
Figure 2B:
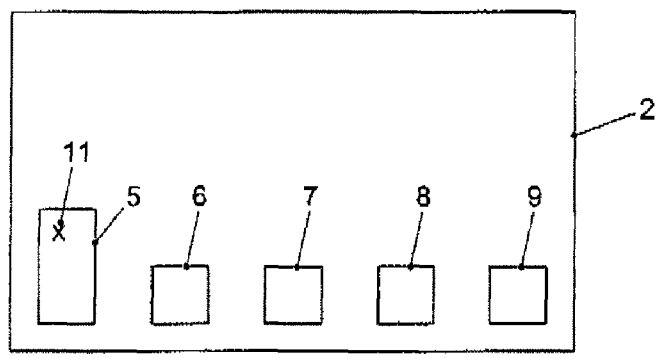

In FIG. 2A, the display unit 2 presents the operator control panels 5-9, which are presented in unenlarged form. A first touch by the user is detected at the touch position 10 labeled "x". Coordinate comparison for the touch position 10 with the coordinates of the operator control panels 5-9 reveals that none of the operator control panels 5-9 has been touched. The distance between the touch position 10 and the coordinates of the operator control panels 5-9 is then determined. The distance between the touch position 10 and the operator control panel 5 can be effected by determining all distances between all coordinates of the operator control panel 5 and the coordinates of the touch position 10 and subsequent averaging, for example. Alternatively, it is possible to determine a center of the operator control panel 5, for example, and to determine a distance between the coordinates of the center of the operator control panel 5 and the coordinates of the touch position 10. In comparable fashion, the distances between the operator control panels 6-9 and the touch position 10 are determined. Since, in FIG. 2A, the distance between the touch position 10 and the operator control panel 5 is significantly shorter in comparison with the distances between the touch position 10 and the operator control panels 6-9 and furthermore the absolute distance between the touch position 10 and the operator control panel 5 is very short, it can be assumed that the user wanted to touch the operator control panel 5. The control unit 4 therefore actuates the display unit 2 such that the operator control panel 5 is presented in enlarged form, as shown in FIG. 2B. The operator control panel 5 has been enlarged to such an extent that it would now comprise the coordinates of the touch position 10 of the first touch by the user. In addition, FIG. 2B shows a touch position 11 for a second touch attempt by the user which results in a hit.

Figure 3A:
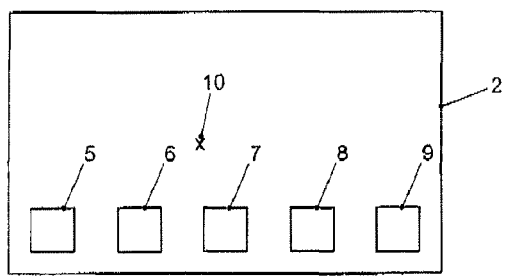
FIGS. 3A-3C schematically show the operation of the operator control system in FIG. 1 in accordance with a further embodiment of the invention.
Figure 3B:
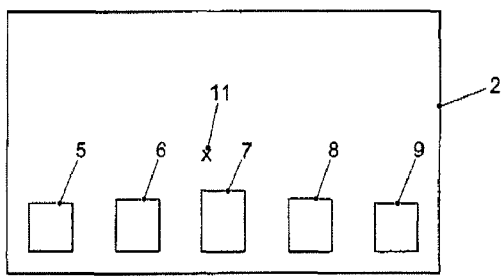
Figure 3C:
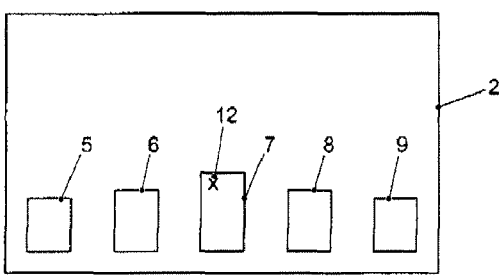

FIG. 3A in turn shows a presentation of the unenlarged operator control panels 5-9 on the display unit 2. A first operator control attempt by the user resulted in the touch-sensitive interface 3 being touched at the touch position 10. Since the touch position 10 occurred significantly further from the operator control panels 5-9 in comparison with the touch position 10 in FIG. 2A and the distance between the touch position 10 and the operator control panel 6 and the operator control panel 7 is only slightly different, it is not only the closest operator control panel (which would be the operator control panel 7 in the present example) that is shown in enlarged form, as in FIG. 2B, but rather all operator control panels 5-9 are presented in enlarged form, as shown in FIG. 3B. In this case, the operator control panels which are at a shorter distance from the touch position 10 are enlarged to a greater extent than operator control panels which are at a greater distance from the touch position 10. Accordingly, the operator control panel 7 is enlarged to the greatest extent, whereas the operator control panel 9 is enlarged to the least extent. The enlarged operator control panels 5-9 shown in FIG. 3B are used by the user to make a second operator control attempt. In this case, he touches the touch-sensitive interface at the touch position 11. Again, there is no hit, since the coordinates of the touch position 11 match none of the coordinates of the operator control panels 5-9. The control unit 4 then produces an even more greatly enlarged presentation of the operator control panels 5-9, as shown in FIG. 3C. Again, the operator control panels which are closest to the touch position 11 are enlarged to a greater extent than the operator control panels which are situated further away from the touch position 11. Hence, as FIG. 3C shows, the operator control panel 7 now has the greatest expanse and, as shown in FIG. 3C, is hit at the touch position 12 at a third touch attempt by the user, which completes the user operation.

Figure 4A:
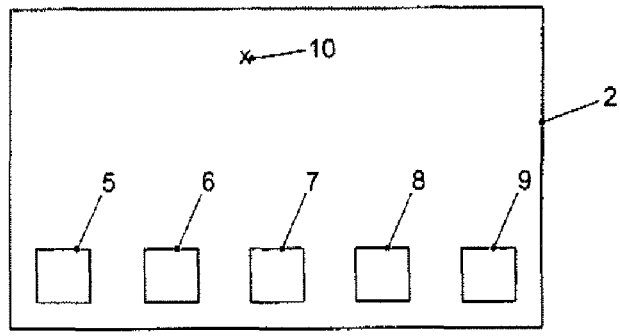
FIGS. 4A-4C schematically show the operation of the operator control system in FIG. 1 in accordance with yet a further embodiment of the invention.
Figure 4B:
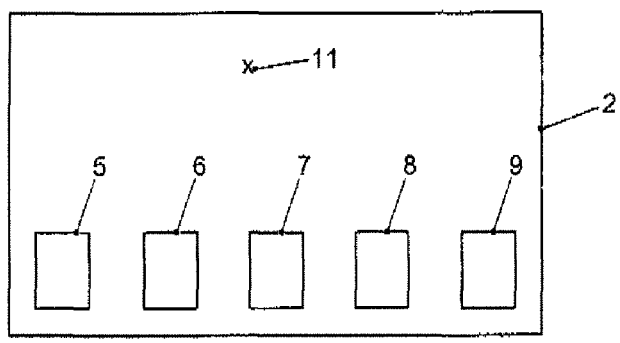
Figure 4C:
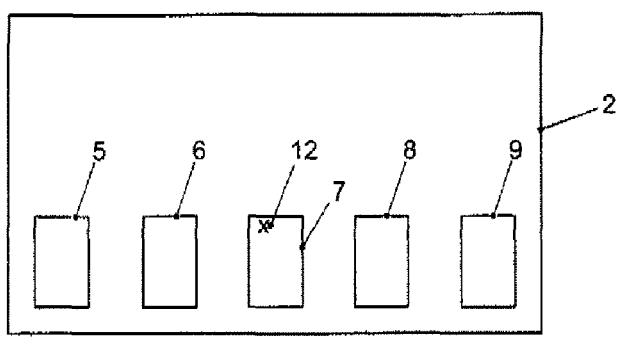

FIG. 4A shows the unenlarged operator control panels 5-9 on the display unit 2 and also a touch position 10 for a first operator control attempt by the user. Again, there is no hit at this first touch attempt. Since the touch position 10 is at a very great distance from all operator control panels 5-9 in this case, the control unit 4 displays evenly enlarged operator control panels 5-9 on the display unit 2, as shown in FIG. 4B. A second operation by the user results in a touch at the touch position 11. Since this touch also produces no hits and is still at a very great distance from all operator control panels 5-9, the operator control panels 5-9 are once again displayed in evenly enlarged form, as shown in FIG. 4C. A third touch at the touch position 12 now finally results in a hit.

The embodiments shown above for the enlargement of the operator control panels 5-9 can also be combined with one another. Furthermore, it is also possible for a touch which has not resulted in a mishit to prompt essentially all operator control panels to be enlarged evenly at first. Furthermore, the frequency of enlargement of an operator control panel can be determined and stored by the control unit 4 and integrated over a relatively long period, so that the operator control panels which have frequently been enlarged are presented essentially in enlarged form on the display unit 2 after some time.

In addition, it is possible for the enlarged presentation to be displayed on the basis of an operator control context. By way of example, the operator control context may comprise a state of an application, e.g. a navigation application. Depending on the operator control context, it is then possible for an operator control panel which has a greatest operator control probability in the respective state to be displayed in enlarged form. It is thus possible, for example after input of a navigation destination in a navigation application, for the operator control panel for starting routing to be presented in enlarged form, since it is very probable after completion of the input of the navigation destination that the routing now needs to be started. This allows the number of mishit to be effectively reduced without using a large proportion of the surface area of the display unit 2 for the operator control panels from the outset.

LIST OF REFERENCE SYMBOLS

1 Operator control system
2 Display unit
3 Touch-sensitive interface
4 Control unit
5-9 Operator control panel
10 Touch position
11 Touch position
12 Touch position

The invention claimed is:
1. A method for operating an operator control system for a vehicle, wherein the operator control system comprises a graphical display unit and a touch-sensitive interface, wherein coordinates from information presented on the display unit are associated with coordinates of the touch-sensitive interface, the method comprising:
  presenting at least one operator control panel on the display unit, wherein the at least one operator control panel is provided for a user to touch to operate an operator control function;
  detecting of a touch on the touch-sensitive interface by the user determining whether the at least one operator control panel has been hit during the touch based on comparison of coordinates of the touch with coordinates of the at least one operator control panel; and recognizing the touch as a mishit based on a determination that the touch-sensitive interface has been touched outside coordinates of the at least one operator control panel;

enlarging presentation of the at least one operator control panel if a mishit is determined, wherein enlargement decreases as the distance between the coordinates of the at least one operator control panel and the coordinates of the mishit increases.

2. The method of claim 1, wherein enlargement of the at least one operator control panel for the enlarged presentation is performed based on a distance between the coordinates of the at least one operator control panel and the coordinates of the detected touch.

3. The method of claim 1, wherein the at least one operator control panel is one of a plurality of operator control panels and the enlargement produces an enlarged presentation of precisely one operator control panel from the plurality of operator control panels, wherein the precisely one operator control panel is enlarged such that it comprises the coordinates of the touch.

4. The method of claim 1, wherein the at least one operator control panel is one of a plurality of operator control panels, and the enlargement provides an enlarged presentation of the plurality of operator control panels, wherein the plurality of operator control panels are enlarged uniformly.

5. A method for operating an operator control system for a vehicle, wherein the operator control system comprises a graphical display unit and a touch-sensitive interface, the method comprising:

presenting at least one operator control panel on the display unit, wherein the at least one operator control panel is provided for a user to touch to operate an operator control function;

detecting of a touch on the touch-sensitive interface by the user;

determining whether the at least one operator control panel has been hit during the touch based on comparison of coordinates of the touch with coordinates of the at least one operator control panel;

recognizing a user input touch as a mishit based on a determination that the touch-sensitive interface has been touched outside coordinates of the at least one operator control panel; and enlarging presentation of the at least one operator control panel if a mishit is determined, wherein enlargement of the at least one operator control panel for enlarged presentation is performed based on a distance between the coordinates of the at least one operator control panel and the coordinates of the detected touch, and wherein enlargement decreases as the distance between the coordinates of the at least one operator control panel and the coordinates of the mishit increases.

6. An operator control system for a vehicle, the control system comprising:

a graphical display unit that presents a piece of information for a user;

a touch-sensitive interface that detects a touch by the user, wherein coordinates from information presented on the display unit are associated with coordinates of the touch-sensitive interface; and a control unit coupled to the display unit and the touch-sensitive interface, the control unit controlling presentation of at least one operator control panel on the display unit, wherein the at least one operator control panel is provided for the user to touch to operate an operator control function, wherein the control unit controls operation of the touch-sensitive interface to detect a touch on the touch-sensitive interface by the user, wherein the control unit determines whether the at least one operator control panel has been hit during the touch by comparing coordinates of the touch with coordinates of the at least one operator control panel, wherein the control unit recognizes the touch as a mishit based on a determination that the touch-sensitive interface has been touched outside coordinates of the at least one operator control panel, wherein the control unit further controls presentation of at least one operator control panel in enlarged form on the display unit if a mishit is determined, and wherein enlargement of the at least one operator control panel for enlarged presentation is performed based on a distance between the coordinates of the at least one operator control panel and the coordinates of the detected touch, and wherein enlargement decreases as the distance between the coordinates of the at least one operator control panel and the coordinates of the mishit increases.

7. The operator control system of claim 6, wherein enlargement decreases as the distance between the coordinates of the at least one operator control panel and the coordinates of the detected touch increases.

8. The operator control system of claim 6, wherein the at least one operator control panel is one of a plurality of operator control panels and wherein enlargement produces an enlarged presentation of precisely one operator control panel from the plurality of operator control panels, wherein the precisely one operator control panel is enlarged such that it comprises the coordinates of the touch.

9. The operator control system of claim 6, wherein the at least one operator control panel is one of a plurality of operator control panels and the enlargement provides an enlarged presentation of the plurality of operator control panels, wherein the plurality of operator control panels are enlarged uniformly.

10. The operator control system of claim 6, wherein enlargement of the presentation of the at least one operator control panel is also based on a state of the operator control system, wherein the state of the operator control system is altered based on input from the user.

11. The operator control system of claim 6 wherein the operator control system determines which operator control panels are operated more frequently and presents at least one operator control panel of those more frequently operated control panels in enlarged form.

* * * * *